(12) United States Patent
Uchida et al.

(10) Patent No.: US 8,675,501 B2
(45) Date of Patent: Mar. 18, 2014

(54) TRANSMISSION APPARATUS AND REPORTING METHOD FOR REPORTING FAULT

(75) Inventors: Tetsuya Uchida, Kawasaki (JP); Takashi Kuwabara, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 161 days.

(21) Appl. No.: 13/311,906

(22) Filed: Dec. 6, 2011

(65) Prior Publication Data

US 2012/0177360 A1 Jul. 12, 2012

(30) Foreign Application Priority Data

Jan. 11, 2011 (JP) ................................. 2011-003066

(51) Int. Cl.
G06F 11/00 (2006.01)
H04L 12/28 (2006.01)
H04J 3/00 (2006.01)
H04J 14/00 (2006.01)
H04B 10/07 (2013.01)

(52) U.S. Cl.
USPC ........... 370/242; 370/216; 370/351; 370/464; 398/1; 398/22

(58) Field of Classification Search
USPC ......... 370/216, 225–231, 235, 236, 241, 242, 370/248, 250–252, 351; 398/1, 9, 10, 17, 398/20–21, 25
See application file for complete search history.

(56) References Cited

U.S. PATENT DOCUMENTS 5,987,327 A * 11/1999 Lev et al. .................... 455/445
7,359,331 B2   4/2008 Takamichi
2001/0040870 A1* 11/2001 Ohmori et al. .............. 370/216
2009/0129777 A1* 5/2009 Singh .............................. 398/58

FOREIGN PATENT DOCUMENTS

JP 2004-320683 11/2004

* cited by examiner

Primary Examiner — Omar Ghowrwal
(74) Attorney, Agent, or Firm — Fujitsu Patent Center (57) ABSTRACT

A transmission apparatus includes a processor that is operative to terminate a first line performing a communication using a digital wrapper, to terminate a signal on a second line performing a communication using Gigabit Ethernet, to apply a transparent transcoding process to a terminated signal and the signal received from the second line and to output these signals; and wherein when a fault occurs in a communication performed through the first line and when there is no response for a predetermined time period after an auto negotiation restart signal is reported to an opposite apparatus on a second line side, to report information indicating an occurrence of the fault to the opposite apparatus by using a signal of a MAC (Media Access Control) frame format.

8 Claims, 9 Drawing Sheets

OAM FRAME SIGNAL CONFORMING TO IEEE802.3ah

| DESTINATION ADDRESS | SOURCE ADDRESS | TYPE | SUB TYPE | FLAG | CODE | DATA/PAD | FCS |
|---|---|---|---|---|---|---|---|

| BIT POSITION | NAMES | CONTENT |
|---|---|---|
| 0 | LINK FAULT | 1: SENSE LINK TEAR IN RECEIVE DIRECTION<br>2: LINK TEAR IS NOT SENSED |
| 1 | DYING GASP | 1: IRECOVERRABLE INTRA-STATION FAULT OCCURS<br>2: IRECOVERRABLE INTRA-STATION FAULT DOES NOT OCCUR |
| 2 | CRITICAL EVENT | 1: THERE IS CRITICAL EVENT<br>2: THERE IS NO CRITICAL EVENT |
| 3-4 | INTRA-STATION DISCOVERY STATUS | 00: DISCOVERY IS INCOMPLETE<br>01: IN THE PROCESS OF DISCOVERY<br>10: DISCOVERY IS COMPLETED<br>11: UNUSED |
| 5-6 | REMOTE DISCOVERY FIELD | |
| 7-8 | RESERVED | UNUSED |

F I G. 5

F I G. 6

F I G. 7

F I G. 8

F I G. 9

TRANSMISSION APPARATUS AND REPORTING METHOD FOR REPORTING FAULT

CROSS-REFERENCE TO RELATED APPLICATION

This application is based upon and claims the benefit of priority of the prior Japanese Patent Application No. 2011-003066, filed on Jan. 11, 2011, the entire contents of which are incorporated herein by reference.

FIELD

The embodiments described below relate to a transmission apparatus and to a reporting method for reporting a fault.

BACKGROUND

A transmission system is known which transparent-relays a Gigabit Ethernet signal (hereinafter referred to as a "GbE (Gigabit Ethernet®) signal") via an OTN (Optical Transport Network) line that is different from the Gigabit Ethernet. That is, a transmission system which connects a plurality of lines of the Gigabit Ethernet (hereinafter referred to as "GbE lines") via the OTN line is known. In the transmission system, a GbE signal is transmitted from a transmission apparatus of the Gigabit Ethernet (hereinafter referred to as a "GbE transmission apparatus") via the GbE line to a transmission apparatus located at the connection point of the Ethernet line and the OTN line (hereinafter referred to as an "OTN transmission apparatus"). An OTN transmission apparatus transparently maps the GbE signal to an ODU signal of the OTN and transmits the ODU signal via the OTN line to another OTN transmission apparatus. That is, without caring about a MAC (Media Access Control) frame which would usually be referred to at transmission or reception of a GbE signal, the OTN transmission apparatus transmits the GbE signal (10B code) to another OTN transmission apparatus by using an ODU signal on the OTN line. The other OTN transmission apparatus transparently demaps the GbE signal from the received ODU signal and transmits it to another GbE transmission apparatus via the GbE line. That is, without caring about a MAC (Media Access Control) frame which would usually be referred to at transmission or reception of a GbE signal, the other OTN transmission apparatus transmits, to another GbE transmission apparatus, the GbE signal (10B code) transferred using the ODU signal on the OTN line. In this way, GbE signals are transparently transmitted and received between the two GbE transmission apparatuses via the OTN line.

As described above, in the transmission system which relays a GbE signal via the OTN line, when a fault occurs in the OTN line, it becomes impossible to normally relay the GbE signal via the OTN line or it becomes difficult to do so. Alternatively, when a fault occurs in a GbE line on the upstream side of the OTN line (i.e., the transmission side of the GbE signal as seen from the OTN line), it becomes impossible to normally relay the GbE signal via the OTN line to a GbE line on the downstream side of the OTN line (i.e., the reception side of the GbE signal as seen from the OTN line) or it becomes difficult to do so. In other words, when a fault occurs in a communication performed through the OTN line, it becomes difficult to maintain a normal communication between a GbE transmission apparatus on the upstream side of the OTN line and a GbE transmission apparatus on the downstream side of the OTN line. Accordingly, when a fault occurs in a communication performed through the OTN line, it is preferable that the occurrence of a fault be reported to the GbE transmission apparatus. In the meantime, a digital wrapper is used as a frame format technology for an optical transmission network, and it is applied to a communication which uses an OTN line. In the meantime, a digital wrapper is also incorporated into ITU-T G.709.

As a technique for reporting an occurrence of a fault, a technique is possible in which the occurrence is reported using an auto negotiation function conforming to IEEE802.3. More specifically, a technique is possible in which, when a fault occurs in a communication performed through an OTN line, the occurrence of a fault is reported to an Ethernet transmission apparatus by transmitting an auto negotiation restart signal (Link Fault) from an OTN transmission apparatus to a GbE transmission apparatus.

Documents of Prior Art

[Patent Document 1] Japanese Laid-open Patent Publication No. 2004-320683

However, not all GbE transmission apparatuses which are opposite to an OTN transmission apparatus via a GbE line are necessarily provided with an auto negotiation function. In other words, an OTN transmission apparatus may be opposite to, via a GbE line, a GbE transmission apparatus not provided with an auto negotiation function. Accordingly, even when an auto negotiation restart signal (Link Fault) is transmitted from the OTN transmission apparatus to the GbE transmission apparatuses, the signal is ignored by the GbE transmission apparatuses not provided with an auto negotiation function. Alternatively, an OTN transmission apparatus may be opposite to, via a GbE line, a GbE transmission apparatus provided with an auto negotiation function that has been invalidated. Accordingly, even if an auto negotiation restart signal (Link Fault) is transmitted from the OTN transmission apparatus to the GbE transmission apparatus, the signal will be ignored by the GbE transmission apparatus in which the auto negotiation function has been invalidated. This could cause a situation in which the OTN transmission apparatus cannot report to the GbE transmission apparatus that a fault has occurred in a communication performed through the OTN line.

SUMMARY

The following embodiment comprises a transmission apparatus includes a processor that is operative to terminate a first line performing a communication using a digital wrapper, to terminate a signal on a second line performing a communication using Gigabit Ethernet, to apply a transparent transcoding process to a terminated signal and the signal received from the second line and to output these signals; and wherein when a fault occurs in a communication performed through the first line and when there is no response for a predetermined time period after an auto negotiation restart signal is reported to an opposite apparatus on a second line side, to report information indicating an occurrence of the fault to the opposite apparatus by using a signal of a MAC (Media Access Control) frame format.

According to the transmission apparatus described above and the reporting method for reporting a fault described above, information indicating an occurrence of a fault in a communication performed through the first line may be appropriately reported via the second line from one transmission apparatus terminating both the first and second lines to another transmission apparatus which is opposite to it.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
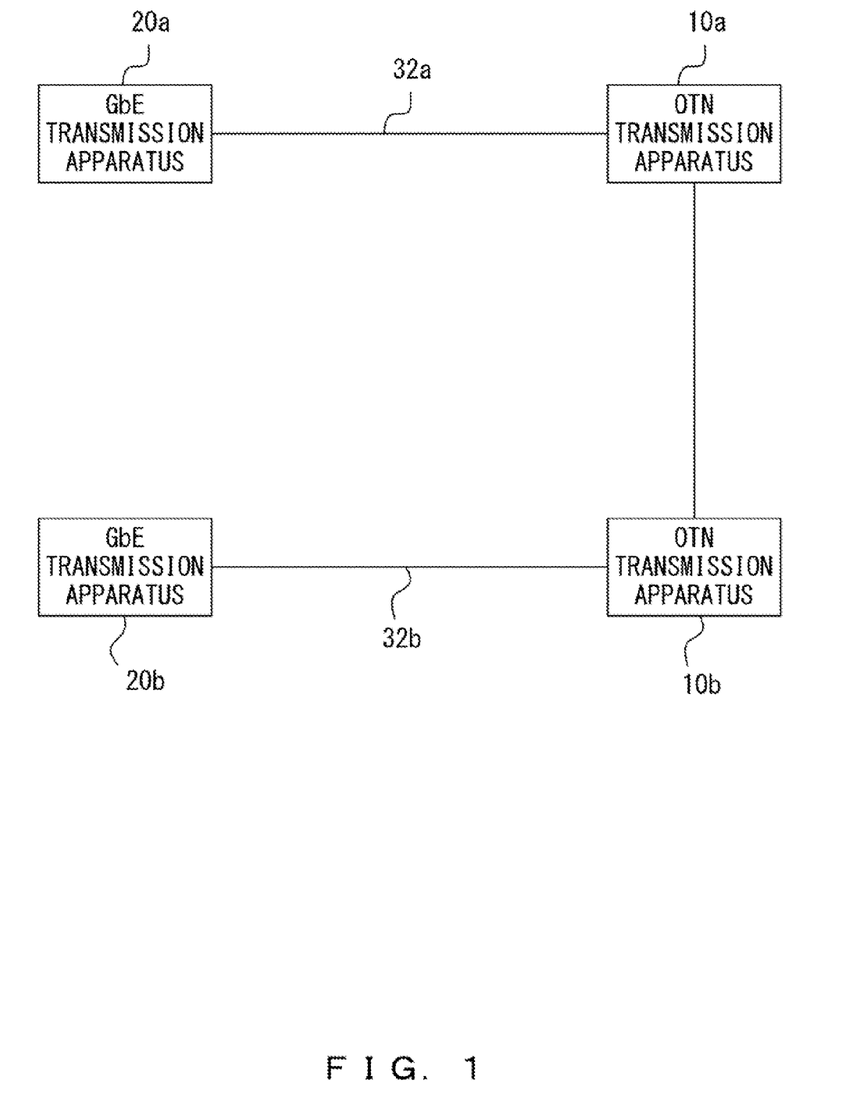
FIG. 1 is a block diagram illustrating a configuration of a transmission system in accordance with the present embodiment.

In the following, modes for implementing the present invention will be described on the basis of the drawings.
(1) Configuration of Transmission System A configuration of a transmission system 1 in accordance with the present embodiment will be described with reference to FIG. 1. FIG. 1 is a block diagram illustrating an exemplary configuration of the transmission system 1 in accordance with the present embodiment.

As illustrated in FIG. 1, the transmission system 1 in accordance with the present embodiment comprises: an OTN (Optical Transport Network) transmission apparatus 10; an OTN transmission apparatus 10b; a Gigabit Ethernet (hereinafter referred to as "GbE" as appropriate) transmission apparatus 20a; a GbE transmission apparatus 20b; an OTN line 31; a GbE line 32a; and a GbE line 32b. Hereinafter, when the OTN transmission apparatuses 10a and 10b do not need to be distinguished from each other, both of them will be referred to as an "OTN transmission apparatus 10" for purposes of illustration. Similarly, when the GbE transmission apparatuses 20a and 20b do not need to be distinguished from each other, both of them will be referred to as a "GbE transmission apparatus 20". Similarly, when the GbE lines 32a and 32b do not need to be distinguished from each other, both of them will be referred to as a "GbE line 32". The number of the OTN transmission apparatuses 10, the number of the GbE transmission apparatuses 20, the number of the OTN lines 31, and the number of the GbE lines 32 illustrated in FIG. 1 are mere examples, and hence they are not limited to those illustrated in FIG. 1.

The OTN transmission apparatus 10 receives a GbE signal transmitted from the GbE transmission apparatus 20 via the GbE line 32, which is a communication line conforming to a GbE standard. The OTN transmission apparatus 10 transparently maps the received GbE signal to an ODU0 (Optical Data Unit 0) frame signal conforming to an OTN standard recommended by ITU-T. The OTN transmission apparatus 10 transmits the ODU0 frame signal to another OTN transmission apparatus 10 via the OTN line 31, which is a communication line conforming to the OTN standard. As an example, in the example illustrated in FIG. 1, the OTN transmission apparatus 10a receives a GbE signal transmitted from the GbE transmission apparatus 20a via the GbE line 32a and transmits an ODU0 frame signal to which the received GbE signal has been mapped to the OTN transmission apparatus 10b via the OTN line 31. Similarly, in the example illustrated in FIG. 1, the OTN transmission apparatus 10b receives a GbE signal transmitted from the GbE transmission apparatus 20b via the GbE line 32b and transmits an ODU0 frame signal to which the received GbE signal has been mapped to the OTN transmission apparatus 10a via the OTN line 31.

In addition, the OTN transmission apparatus 10 receives an ODU0 frame signal transmitted from another OTN transmission apparatus 10 via the OTN line 31. The OTN transmission apparatus 10 transparently demaps (i.e., extracts) a GbE signal from the received ODU0 frame signal. The OTN transmission signal 10 transmits the extracted GbE signal to the GbE transmission apparatus 20 via the GbE line 32. As an example, in the example illustrated in FIG. 1, the OTN transmission apparatus 10a receives an ODU0 frame signal transmitted from the OTN transmission apparatus 10b via the OTN line 31 and transmits a GbE signal extracted from the received ODU0 frame signal to the GbE transmission apparatus 20a via the GbE line 32a. Similarly, in the example illustrated in FIG. 1, the OTN transmission apparatus 10b receives an ODU0 frame signal transmitted from the OTN transmission apparatus 10a via the OTN line 31 and transmits a GbE signal extracted from the received ODU0 frame signal to the GbE transmission apparatus 20b via the GbE line 32b.

The GbE transmission apparatus 20 transmits a GbE signal to the OTN transmission apparatus 10 via the GbE line 32. As an example, in the example illustrated in FIG. 1, the GbE transmission apparatus 20a transmits a GbE signal to the OTN transmission apparatus 10a via the GbE line 32a. Similarly, also in the example illustrated in FIG. 1, the GbE transmission apparatus 20b transmits a GbE signal to the OTN transmission apparatus 10b via the GbE line 32b.

In addition, the GbE transmission apparatus 20 receives a GbE signal transmitted from the OTN transmission apparatus 10 via the GbE line 32. As an example, in the example illustrated in FIG. 1, the GbE transmission apparatus 20a receives a GbE signal transmitted from the OTN transmission apparatus 10a via the GbE line 32a. Similarly, in the example illustrated in FIG. 1, the GbE transmission apparatus 20b receives a GbE signal transmitted from the OTN transmission apparatus 10b via the GbE line 32b.

For example, IEEE802.3z (1000BASE-SX, 1000BASE-LX, 1000BASE-CX) and IEEE802.3ab (1000BASE-T) are introduced as GbE standards.

Figure 2:
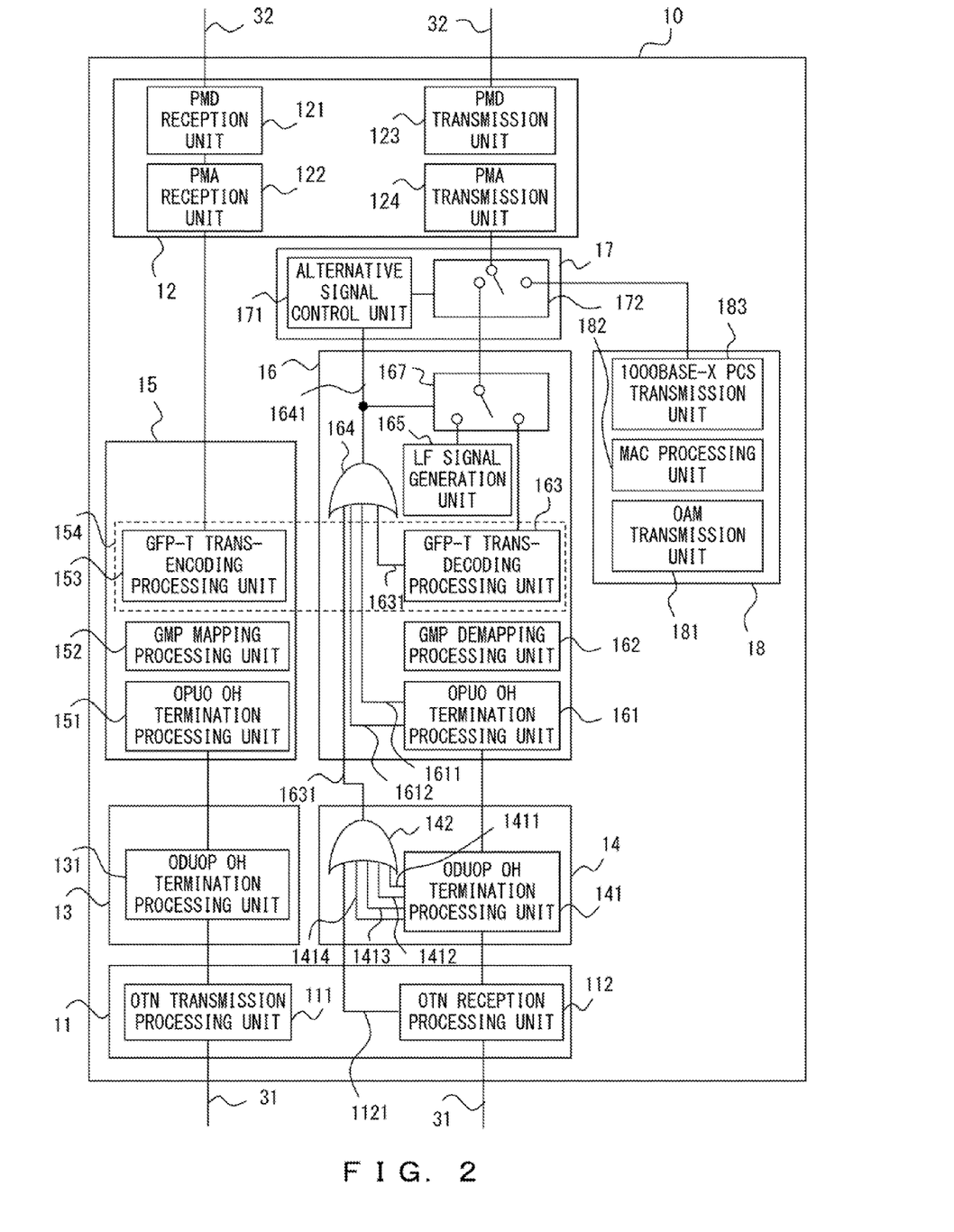
FIG. 2 is a block diagram illustrating a configuration of an OTN transmission apparatus in accordance with the present embodiment.

G.709 and the like recommended by ITU-T are introduced as OTN standards recommended by ITU-T.
(2) Configuration of OTN Transmission Apparatus The configuration of the OTN transmission apparatus 10 in accordance with the present embodiment will be described with reference to FIG. 2. FIG. 2 is a block diagram showing the configuration of the OTN transmission apparatus 10 in accordance with the present embodiment.

As illustrated in FIG. 2, the OTN transmission apparatus 10 comprises: an OTN interface 11; a GbE interface 12; an ODU0P termination unit 13; an ODU0P termination unit 14; a transparent-mapping processing unit 15; a transparent-demapping processing unit 16; a signal switching unit 17; an OAM frame signal transmission unit 18; and an processor that is operative to terminate a first line performing a communication using a digital wrapper, to terminate a signal on a second line performing a communication using Gigabit Ethernet, to apply a transparent transcoding process to a terminated signal, to report information indicating an occurrence of the fault to the opposite apparatus by using a signal of a MAC (Media Access Control) frame format. The processor may be CPU, circuit, or FPGA (Field Programmable Gate Array).

The OTN interface 11 is an example of the "first termination means", and it is a communication interface which terminates the OTN line 31. The OTN interface 11 comprises an OTN reception processing unit 112 which extracts an ODU0 frame signal transmitted from another OTN transmission apparatus 10 via the OTN line 31 and transfers the extracted ODU0 frame signal to the ODU0P termination unit 14. In addition, the OTN reception processing unit 112 reports, to the ODU0P termination unit 14 (in particular, an ODU0 alarm detection unit 142 comprised by the ODU0P termination unit 14), a low-order-layer alarm signal 1121 which indicates the presence/absence of a fault in a low order layer. In addition, the OTN interface 11 comprises an OTN transmission processing unit 111 which transmits an ODU0 frame signal transferred from the ODU0P termination unit 13 to another OTN transmission apparatus 10 via the OTN line 31.

The GbE interface 12 is an example of the "second termination unit", and it is a communication interface accommodating the GbE line 32. The GbE interface 12 receives a GbE signal transmitted from the GbE transmission apparatus 20 via the GbE line 32 and transfers it to a transparent mapping processing unit 15 while maintaining 10B code. To realize the transfer operation, the GbE interface 12 comprises: a PMD (Physical Medium Dependent) reception unit 121 connected to a physical medium, such as an optical fiber, constituting the GbE line 32; and a PMA (Physical Medium Attachment) reception unit 122 to connect the PMD reception unit 121 to the transparent mapping processing unit 15. In addition, the GbE interface 12 transmits a GbE signal transferred from the transparent-demapping processing unit 16 to the GbE transmission apparatus 20 via the GbE line 32. To realize the transmission operation, the GbE interface 12 comprises: a PMD reception unit 123 connected to a physical medium, such as an optical fiber, constituting the GbE line 32; and a PMA send unit 124 to connect the PMD reception unit 123 to the transparent-demapping processing unit 16.

The ODU0P termination unit 13 terminates an OPU0 frame signal (i.e., a frame signal including an OPU OH (Optical channel Payload Unit OverHead) and an OPU payload) transferred from the transparent mapping processing unit 15. In particular, the ODU0P termination unit 13 comprises an ODU0P OH termination unit 131 which adds an ODU OH to the OPU0 frame signal transferred from the transparent mapping processing unit 15. As a result of this, an ODU0 frame signal is generated. The ODU0P termination unit 13 transfers the generated ODU0 frame signal to the OTN transmission processing unit 111.

The ODU0P termination unit 14 terminates an ODU0 frame signal transferred from the OTN reception processing unit 112. In particular, the ODU0P termination unit 14 comprises an ODU0P OH termination processing unit 141 which extracts an ODU OH from the ODU0 frame signal transferred from the OTN reception processing unit 112. The ODU0P termination unit 14 transfers, to the transparent-demapping processing unit 16, the ODU0 frame signal after the extraction of the ODU OH (i.e., an OPU0 frame signal).

The transparent mapping processing unit 15 maps a GbE signal received by the GbE interface 12 to an OPU0 frame signal. Accordingly, the transparent mapping processing unit 15 comprises an OPU0 OH termination processing unit 151, a GMP (Generic Mapping Procedure) mapping processing unit 152, and a GFP-T (Transparent Generic Frame Procedure) trans-encoding processing unit 153. The GFP-T trans-encoding processing unit 153 transcodes a GbE signal (10B code) into a GFP-T frame signal in accordance with G.709 recommended by ITU-T (e.g., Chapter 17.7.1.1). In addition, through a GMP, the GMP mapping processing unit 152 maps the GFP-T frame signal generated as a result of the transcoding to an OPU0 payload. The OPU0 OH termination processing unit 151 adds an OPU OH to the OPU0 payload generated as a result of the mapping by the GMP mapping processing unit 152. As a result of this, an OPU0 frame signal is generated. The generated OPU-0 frame signal is transferred to the ODU0P termination unit 13.

The transparent-demapping processing unit 16 demaps an OPU0 frame signal received by the OTN interface 11 and terminated by the ODU0P termination unit 14 (i.e., an OPU0 frame signal from which an ODU OH has been extracted by the ODU0P termination unit 14). More particularly, the transparent-demapping processing unit 16 extracts a GbE signal by demapping the ODU0 frame signal received by the OTN interface 11 and terminated by the ODU0P termination unit 14. Accordingly, the transparent-demapping processing unit 16 comprises an OPN0 OH termination processing unit 161, a GMP demapping processing unit 162, and a GFP-T trans-decoding processing unit 163. The OPU0 OH termination processing unit 161 terminates an OPU0 frame signal. More particularly, the OPU0 OH termination processing unit 161 extracts an OPU payload by extracting an OPU OH from the OPU0 frame signal. The OPU0 OH termination processing unit 161 transfers the extracted OPU0 payload to the GMP demapping processing unit 162. Through a GMP, the GMP demapping processing unit 162 demaps the OPU0 payload to a GFP-T frame signal. The GFP-T trans-decoding processing unit 163 trans-decodes the GFP-T frame signal transferred from the GMP demapping processing unit 162 into a GbE signal (10B code). The GFP-T trans-decoding processing unit 163 transfers the GbE signal obtained via the trans-decoding (10B code) to the GbE interface 12 via a switch 167.

The GFP-T trans-encoding processing unit 153 and the GFP-T trans-decoding processing unit 163 may constitute a transparency processing unit 154.

The transparent-demapping processing unit 16 further comprises an LF (Link Failure) signal generation unit 165 which generates an auto negotiation restart signal (a link fault signal). The LF signal generation unit 165 transfers the generated auto negotiation restart signal (link fault signal) via the switch 167 to the GbE interface 12.

The switch 167 transfers, to the GbE interface 12, one of a GbE signal (10B code) transferred from the GFP-T trans-decoding processing unit 162 and an auto negotiation restart signal (a link fault signal) transferred from the LF signal generation unit 165. Accordingly, one of the GbE signal (10B code) and the auto negotiation restart signal (the link fault signal) is transmitted from the OTN transmission apparatus 10 to the GbE line 32. As an example, when a fault does not occur in a communication performed through the OTN line 31, the switch 167 may transfer the GbE signal (10B code) to the GbE interface 12. Alternatively, when a fault occurs in a communication performed through the OTN line 31, the switch 167 may transfer the auto negotiation restart signal (the link fault signal) to the GbE interface 12.

The OTN transmission apparatus 10 further comprises a configuration for detecting a fault which occurs in a communication performed through the OTN line 31. In other words, the OTN transmission apparatus 10 further comprises a configuration for determining whether or not a fault has occurred in a communication performed through the OTN line 31. Note that, in addition to a fault which occurs in the OTN line 31 itself, "a fault in a communication performed through the OTN line 31" in the present embodiment may include, for example, a fault in the GbE line 32 located upstream from the OTN transmission apparatus 10. An example of a "fault" in the present embodiment is an event which hinders a normal or stable communication performed through the OTN line. More specifically, examples of a "fault" in the present embodiment are a physical or logical link tear in the OTN line 31, a physical or logical link tear in the GbE line 32 on the upstream side, an abnormality in the state of an ODU0 frame signal, a GFP frame signal, or a GbE signal, and the like. Another example of a "fault" in the present embodiment is an event which might possibly hinder a normal or stable communication performed through the OTN line in the future (e.g., detection of abnormal values (or values other than an allowed value) of various parameters indicating the state of a communication performed through the OTN line 31).

To detect a fault in a communication performed through the OTN line 31, the OTN transmission apparatus 10 may comprise an ODU0 alarm processing unit 142 within the ODU0P termination unit 14 and a CSF (Client Signal Fail) alarm processing unit 164 within the transparent-demapping processing unit 16.

The ODU0 alarm processing unit 142 determines whether a fault has occurred in the OTN line 31 or not by monitoring an ODU0 frame signal terminated by the ODU0P OH termination processing unit 141. In particular, when the ODU0 frame signal itself is in a fail state, the ODU0 alarm processing unit 142 may determine that a fault has occurred in the OTN line 31. Meanwhile, when the ODU0 frame signal itself is not in a fail state, the ODU0 alarm processing unit 142 may determine that a fault has not occurred in the OTN line 31. The determination of whether the ODU0 frame signal is in a fail state or not may be made by detecting an ODU0-AIS (Alarm Indicator Signal) 1412, an ODU0-LCK (LOCKED) 1413, or an ODU0-OCI (Open Connection Indicator) 1414 on the basis of a value of a STAT field included in the ODU0 frame signal. Alternatively, the determination may be made by detecting an expected-value comparison-result alarm dTIM (Trace Identifier Mismatch defect) 1411 of a TTI (Trail Trace Identifier) subfield within a PM (Path Monitoring) field included in the ODU0 frame signal. The ODU0 alarm processing unit 142 applies logical OR processing to the ODU0 alarms and the low-order-layer alarm signal 1121 from the OTN reception processing unit 112 and reports them to the CSF alarm processing unit 164 as an ODU0 alarm signal 1421.

The CSF alarm processing unit 164 determines whether or not a fault has occurred in the GbE line 32 on the upstream side of the OTN line 31 by monitoring an OPU0 frame signal terminated by the OPU0P OH termination processing unit 161, a GFP-T frame signal trans-decoded at the GFP-T trans-decoding processing unit 163, and the like. In particular, when a demapped GbE signal is in a CSF state, the CSF alarm processing unit 164 may determine that a fault has occurred in the GbE line 32 upstream from the OTN line 31. Meanwhile, when a GbE signal is not in a CSF state, the CSF alarm processing unit 164 may determine that a fault has not occurred in the GbE line 32 upstream from the OTN line 31. The determination of whether a GbE signal is in a CSF state or not may be made on the basis of reception states 1631 of a Client signal fail (loss of client signal) frame, a Client signal fail (loss of a character synchronization) frame, a Client forward defect indication (FDI), and a Client defect clear indication (DCI) frame, each of which is a type of GFP CMF (Client management frame). Alternatively, the CSF alarm processing unit 164 may determine that a fault has occurred in the GbE line 32 upstream from the OTN line 31 when a trans-decoded GbE signal (10B code) is an auto negotiation restart signal (a link fault signal). Alternatively, the CSF alarm detection unit 164 may determine that there is an error in the setting of the OTN line 31 or that a fault has occurred in the GbE line 32 upstream from the OTN line 31 when a dPLM (Payload Mismatch defect) 1611 state or dCSF (Client Signal Fail defect) 1612 state is detected from PSI (Payload Structure Identifier) overhead information of an OPU0 frame signal extracted at the OPU0 OH termination processing unit 161. The CSF alarm processing unit 152 applies logical OR processing to the CSF alarms and the ODU0 alarm signal 1421 from the ODU0 alarm detection processing unit 142 and reports them to the switch 167 and the signal switching unit 17 as a CSF alarm signal 1641.

In accordance with the CSF alarm signal 1641 at the ODU0 alarm processing unit 142, the CSF alarm processing unit 164, and the like, the signal switching unit 17 selects one of an output from the transparent-demapping processing unit 16 and an output from the OAM frame signal transmission unit 18. In particular, the signal switching unit 17 comprises an alternative signal control unit 171 and a switch 172. In accordance with the CSF alarm signal 1641, the alternative signal control unit 171 controls the switch 172 to select one of an output from the transparent-demapping processing unit 16 and an output from the OAM frame signal transmission unit 18 as a signal to be actually output. More particularly, it is preferable that, when a fault does not occur in a communication performed through the OTN line 31, the alternative signal control unit 171 controls the switch 172 to select an output from the transparent-demapping processing unit 16 as a signal to be actually output. Meanwhile, it is preferable that, when a fault occurs in a communication performed through the OTN line 31, the alternative signal control unit 171 controls the switch 172 to select an output from the OAM frame signal transmission unit 18 as a signal to be actually output.

The signal switching unit 17 and the OAM frame signal transmission unit 18 may each be an example of the "report unit".

The OAM frame signal transmission unit 18 is an example of the "report unit", and, when it is detected that a fault has occurred in a communication performed through the OTN line 31, the OAM frame signal transmission unit 18 reports to a GbE transmission apparatus 20 which is opposite to this unit 18 via the GbE line 32 that the fault has occurred. In particular, the OAM frame signal transmission unit 18 comprises: an OAM transmission unit 181 which generates an OAM (Operation Administration and Maintenance) frame signal for reporting that a fault has occurred; a MAC processing unit 182 which applies MAC processing (e.g., insertion of a MAC address and an FCS (Frame Check Sequence)) to the OAM frame signal; and a 1000BASE-X PCS transmission unit 183 which converts the OAM frame signal to which MAC processing has been applied into a 10B code. As an example, an OAM signal conforming to IEEE802.3ah or an OAM signal conforming to Y.1731 recommended by ITU-T is preferable to use as the OAM frame signal above. However, by generating another frame signal not including the OAM signals (i.e., a signal of a MAC frame format which is capable of reporting that a fault has occurred in a preferable manner), the OAM frame signal transmission unit 18 may report to the GbE transmission apparatus 20 which is opposite to this unit 18 via the GbE line 32 that a fault has occurred in a communication performed through the OTN line 31. In other words, by generating an optional frame signal which directly or indirectly indicates that a fault has occurred in a communication performed through the OTN line 31, the OAM frame signal generation unit 18 may report to the GbE transmission apparatus 20 which is opposite to this unit 18 via the GbE line 32 that a fault has occurred in a communication performed through the OTN line 31.

(3) Exemplary Operations of OTN Transmission Apparatus

Figure 3:
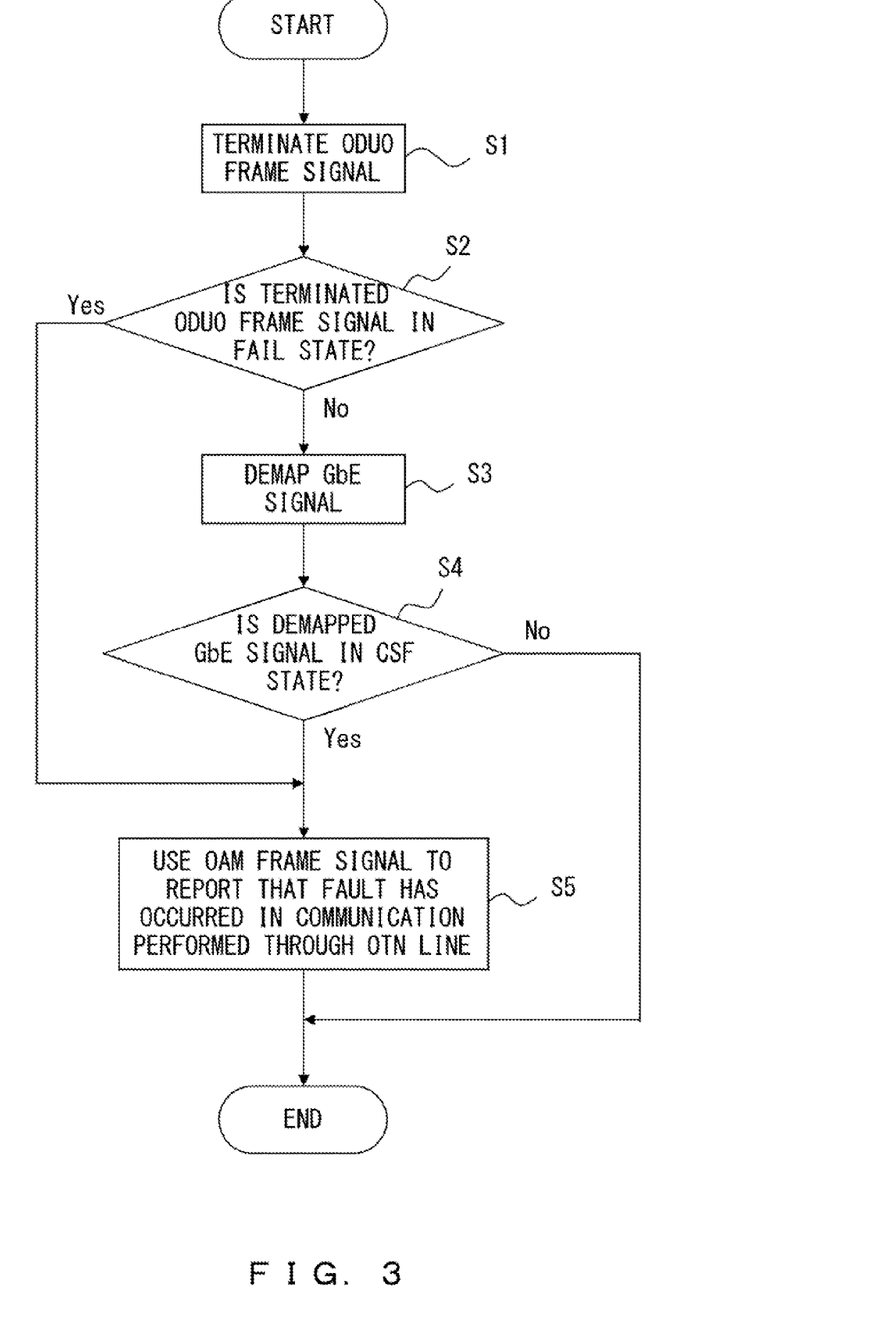
FIG. 3 is a flowchart illustrating an operation flow of the OTN transmission apparatus in accordance with the present embodiment.
Figure 4:
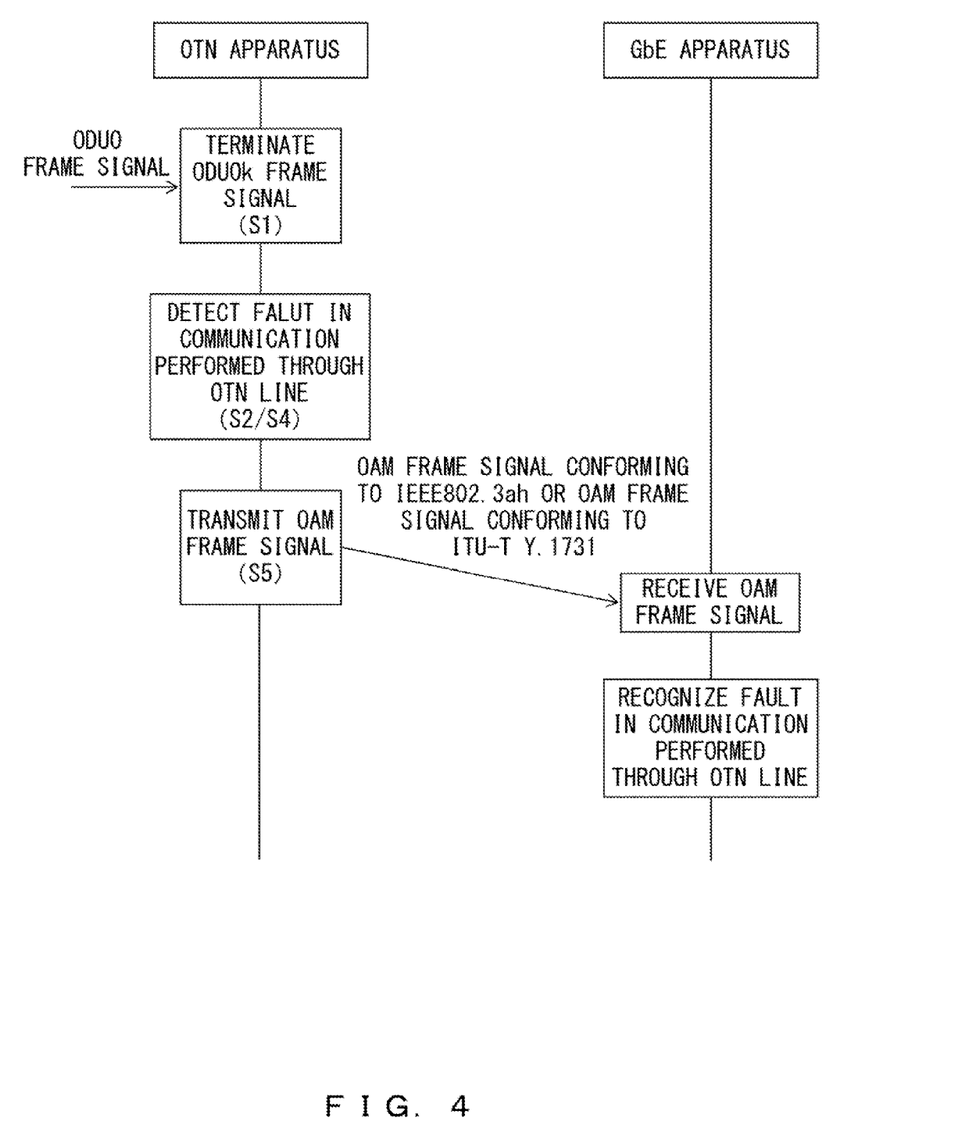
FIG. 4 is a sequence diagram illustrating the operation flow of the OTN transmission apparatus in accordance with the present embodiment.

Operations of the OTN transmission apparatus 10 in accordance with the present embodiment will be described with reference to FIGS. 3 and 4. FIG. 3 is a flowchart showing an operation flow of the OTN transmission apparatus 10 in accordance with the present embodiment. FIG. 4 is a sequence diagram showing the operation flow of the OTN transmission apparatus 10 in accordance with the present embodiment.

As illustrated in FIGS. 3 and 4, the ODU0P OH termination processing unit 141 terminates an ODU0 frame signal transmitted from another OTN transmission apparatus 10 via the OTN line 31 (step S1). In parallel with the operation of step S1, the OTN interface 11 may transmit an ODU0 frame signal transferred from the ODU0P termination unit 13 to another OTN transmission apparatus 10 via the OTN line 31. Similarly, in parallel with the operation of step S1, the GbE interface 12 may receive a GbE signal transmitted from the GbE transmission apparatus 20 via the GbE line 32. Similarly, the GbE interface 12 may transmit a GbE signal transferred from the transparent-demapping processing unit 16 to the GbE transmission apparatus 20 via the GbE line 32.

Next, the ODU alarm processing unit 142 determines whether the ODU0 frame signal terminated by the ODU0P OH termination processing unit 141 is in a fail state or not (step S2). As described above, the determination in step S2 may be made by detecting an ODU0-AIS1412, ODU0-LCK1413, or ODU0-OCI1414.

When it is determined that the ODU0 frame signal is in a fail state as a result of the determination in step S2 (step S2: Yes), it is assumed that a fault has occurred in the OTN line 31. Accordingly, in this case, the alternative signal control unit 171 controls the switch 172 to select an output from the OAM frame signal transmission unit 18 as a signal to be actually output. As a result, using an OAM frame signal, the OAM frame signal transmission unit 18 reports to a GbE transmission apparatus 20 which is opposite to this unit 18 via the GbE line 32 that a fault has occurred in a communication performed through the OTN line 31 (step S5). In other words, using the OAM frame signal, the OAM frame signal transmission unit 18 reports to the GbE transmission apparatus 20 which is opposite to this unit 18 via the GbE line 32 on the downstream side that a fault has occurred in a communication performed through the OTN line 31 on the upstream side. As an example, an OAM signal conforming to IEEE802.3ah or an OAM signal conforming to Y.1731 recommended by ITU-T is preferable to use as the OAM frame signal above, as described above. In particular, the OAM transmission unit 181 comprised by the OAM frame signal transmission unit 18 generates an OAM frame signal for reporting that a fault has occurred in a communication performed through the OTN line 31. The MAC processing unit 182 comprised by the OAM frame signal transmission unit 18 applies MAC processing to the OAM frame signal. The 1000BASE-X PCS transmission unit 183 comprised by the OAM frame signal transmission unit 18 transmits the generated OAM frame signal to the GbE transmission apparatus 20 via the signal switching unit 17, the GbE interface 12, and the GbE line 32. As a result, through the reception of the OAM signal, the GbE transmission apparatus 20 may recognize that a fault has occurred in the OTN line 31.

In the present embodiment, the OAM transmission unit 181 may generate an OAM signal when a fault occurs in a communication performed through the OTN line 31. In other words, the OAM transmission unit 181 does not need to generate an OAM signal when a fault does not occur in a communication performed through the OTN line 31. In this case, upon receipt of a report on a fault status from, for example, the alternative signal control unit 171, the OAM transmission unit 181 may determine whether to generate an OAM signal or not. Alternatively, in consideration of the fact that an output from the OAM frame signal transmission unit 18 is selected by the signal switching unit 171, the OAM transmission control unit 181 may always generate an OAM frame signal (i.e., the OAM transmission control unit 181 may also generate an OAM frame signal when a fault does not occur in a communication performed through the OTN line 31).

When the OAM frame signal transmission unit 18 transmits an OAM frame signal because of the operation of the signal switching unit 17, it is preferable that a GbE signal demapped at the transparent-demapping processing unit 16 not be transmitted to the GbE transmission apparatus 20 via the GbE interface 12 and the GbE line 32. However, when the OAM frame signal transmission unit 18 transmits an OAM frame signal, a GbE signal demapped at the transparent-demapping processing unit 16 may also be transmitted to the GbE transmission apparatus 20 via the GbE interface 12 and the GbE line 32.

Figure 5:
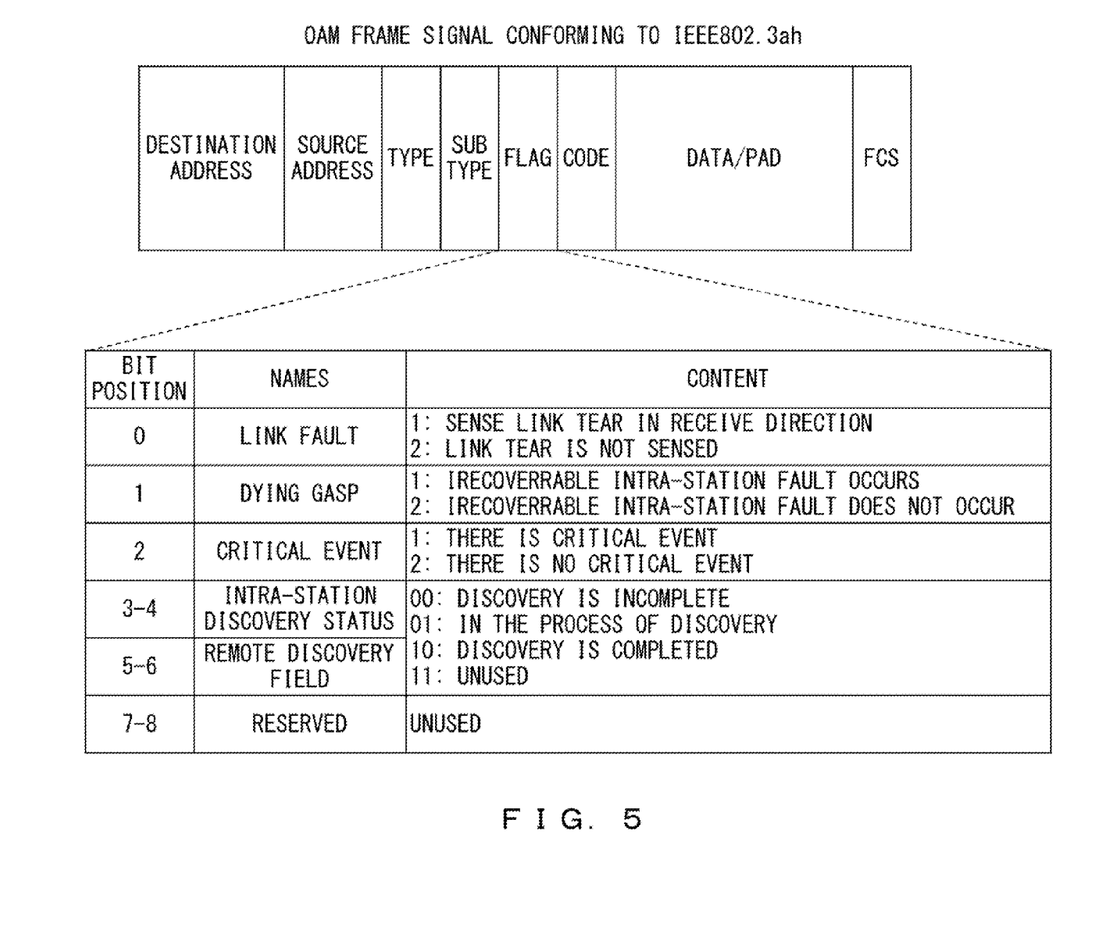
FIG. 5 is a data structure diagram illustrating a data structure of an OAM frame signal conforming to IEEE802.3ah.
Figure 6:
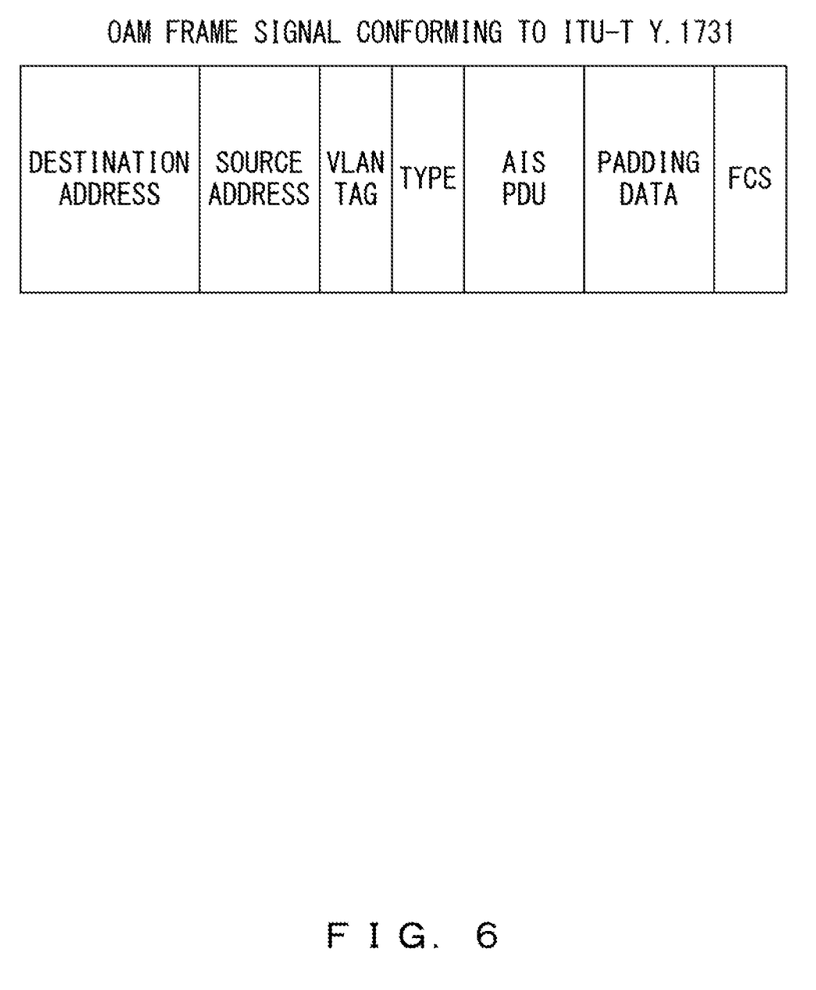
FIG. 6 is a data structure diagram illustrating a data structure of an OAM frame signal conforming to Y.1731 recommended by ITU-T.

Here, the data structure of an OAM frame signal will be described with reference to FIGS. 5 and 6. FIG. 5 is a data structure diagram showing a data structure of an OAM frame signal conforming to IEEE802.3ah. FIG. 6 is a data structure diagram showing a data structure of an OAM frame signal (ETH-AIS) conforming to Y.1731 recommended by ITU-T.

As illustrated in FIG. 5, the OAM frame signal conforming to IEEE802.3ah comprises: a destination address field; a source address field; a type field; a subtype field; a flag field; a code field; a data/pad (padding) field; and an FCS (Flag Check Sequence) field. Using the flag field from among these fields, the fact that a fault has occurred in the OTN line 31 is reported.

As illustrated in the lower part of FIG. 5, the flag field comprises: a Link Fault field at a bit position 0; a Dying Gasp field at a bit position 1; a Critical Event field at a bit position 2; an intra-station discovery field at bit positions 3 and 4; a remote discovery field at bit positions 5 and 6; and a reserve field at bit positions 7 to 15. The fact that a fault has occurred in a communication performed through the OTN line 31 is reported using an OAM frame signal wherein at least one of the values of the Link Fault field, the Dying Gasp field, and the Critical Event field from among the fields above is set to "1".

As illustrated in FIG. 6, an OAM frame signal conforming to Y.1731 recommended by ITU-T comprises a destination address field, a source address field, a VLAN tag, a length/type field, an AIS PDU, a pad, and an FCS field. The AIS PDU from among these reports that a fault has occurred in a communication performed through the OTN line 31.

Referring to FIGS. 3 and 4 again, when it is determined that the ODU0 frame signal is not in a fail state as a result of the determination in step S2 (step S2: No), the transparent-demapping processing unit 16 demaps (i.e., trans-decodes) a GbE signal (step S3).

Next, the CSF alarm processing unit 164 determines whether the GbE signal extracted at the GFP-T trans-decoding processing unit 163 is in a CSF state or not (step S4). As described above, the determination of step S4 may be made in accordance with the reception states 1631 of GFP CMFs (such as CSF and FDI), an auto negotiation restart signal, the ODU0 dPLM 1611 state, or the ODU0 dCSF 1612 state.

When it is determined that the GbE signal is in a CSF state as a result of the determination in step S4 (step S4: Yes), it is assumed that a fault has occurred in a communication performed through the OTN line 31. Accordingly, in this case, the alternative signal control unit 171 controls the switch 172 to select an output from the OAM frame signal transmission unit 18 as a signal to be actually output. As a result, using an OAM frame signal, the OAM frame signal transmission unit 18 reports to a GbE transmission apparatus 20 which is opposite to this unit 18 via the GbE line 32 that a fault has occurred in a communication performed through the OTN line 31 (step S5).

Meanwhile, when it is determined that the GbE signal is not in a CSF state as a result of the determination in step S4 (step S4: No), it is assumed that a fault has not occurred in a communication performed through the OTN line 31. In this case, accordingly, the OAM frame signal transmission unit 18 does not need to transmit an OAM frame signal to the GbE transmission apparatus 20. In this case, the OTN transmission apparatus 10 may perform a normal operation (i.e., an operation for transmitting and receiving an OTN frame signal and a GbE signal). In other words, the alternative signal control unit 171 may control the switch 172 to select an output from the transparent-demapping processing unit 16 as a signal to be actually output.

As described above, using an OAM signal conforming to IEEE802.3ah or an OAM signal conforming to Y.1731 recommended by ITU-T, the OTN transmission apparatus 10 in accordance with the present embodiment can report to the GbE transmission apparatus 20 that a fault has occurred in a communication performed through the OTN line 31. In other words, without using an auto negotiation function conforming to IEEE802.3, the OTN transmission apparatus 10 in accordance with the transmission system 1 of the present embodiment can report to the GbE transmission apparatus 20 that a fault has occurred in a communication performed through the OTN line 31. Accordingly, even when the GbE transmission apparatus 20 is not provided with an auto negotiation function, the OTN transmission apparatus 10 can appropriately report to the GbE transmission apparatus 20 that a fault has occurred in a communication performed through the OTN line 31. Alternatively, even when the auto negotiation function provided for the GbE transmission apparatus 20 is invalidated, the OTN transmission apparatus 10 can appropriately report to the GbE transmission apparatus 20 that a fault has occurred in a communication performed through the OTN line 31.

At normal times (i.e., when a fault does not occur), the OTN transmission apparatus 10 in accordance with the present embodiment may transparently transmit a GbE signal (10B code) without caring about a MAC frame, and, when a fault occurs, then, by using an OAM frame signal of MAC frame format, the apparatus 10 may report to the GbE transmission apparatus 20 that the fault has occurred. Accordingly, even when the OTN transmission apparatus 10 transparently transmits a GbE signal (10B code) without caring about a MAC frame, it may report to the GbE transmission apparatus 20 in a preferable manner that a fault has occurred in the OTN line 31 or in the GbE line 32 on the upstream side.

When the OTN line 31 is used for a long distance, the auto negotiation between the GbE transmission apparatuses 20 performed via the OTN line 31 does not function normally; accordingly, the auto negotiation function of the GbE transmission apparatus 20 is set invalidated more often than typical LAN instruments. Therefore, the aforementioned advantage will be more significant when the OTN transmission apparatus 10 described above is applied to the transmission system 1 comprising the GbE transmission apparatus 20.

(4) Variation of OTN Transmission Apparatus

A variation of the OTN transmission apparatus 10_1 will be described with reference to FIGS. 7 through 9. Detailed descriptions of configurations and operations similar to those of the OTN transmission apparatus 10 described above will be omitted by giving the same reference signs and the same step numbers.

(4-1) Configuration of Variation of Transmission Apparatus

The configuration of the variation of the OTN transmission apparatus 10_1 will be described with reference to FIG. 7. FIG. 7 is a block diagram showing the configuration of the variation of the OTN transmission apparatus 10_1.

Figure 7:
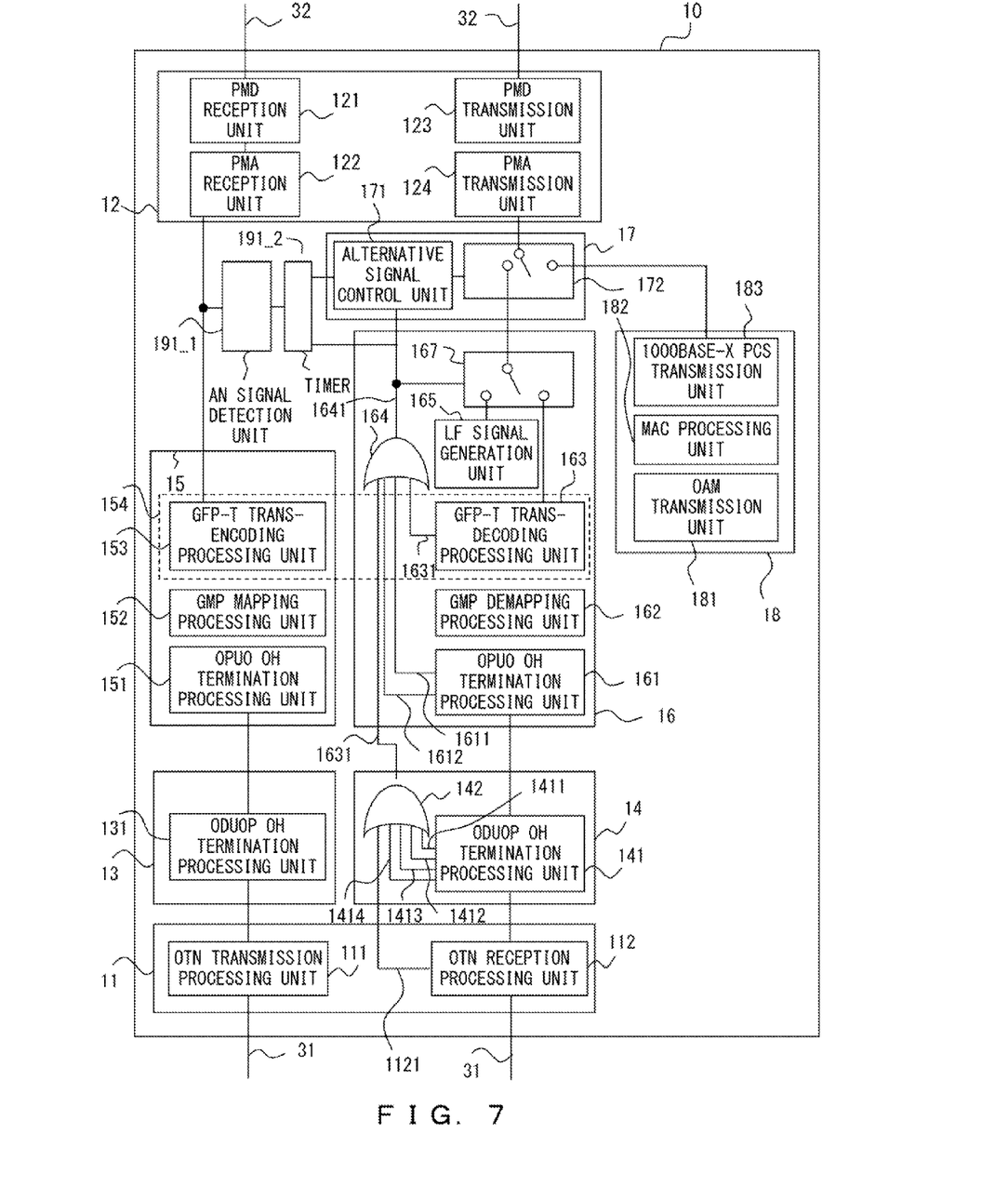
FIG. 7 is a block diagram illustrating a configuration of a variation of the OTN transmission apparatus.

As illustrated in FIG. 7, the OTN transmission apparatus 10_1 in accordance with the variation comprises: an OTN interface 11; a GbE interface 12; an ODU0P termination unit 13; an ODU0P termination unit 14; a transparent-mapping processing unit 15; a transparent-demapping processing unit 16; a signal switching unit 17; and an OAM frame signal transmission unit 18, as with the OTN transmission apparatus 10 described above.

The OTN transmission apparatus 10_1 in accordance with the variation further comprises an auto negotiation (AN) signal detection unit 191_1 and a timer 192_1.

The auto negotiation signal detection unit 191_1 detects whether or not a response to an auto negotiation restart signal (a link fault signal) generated and transmitted by the LF signal generation unit 165 (e.g., an auto negotiation restart signal or the like) is transmitted from a GbE transmission apparatus 20 which is opposite to this unit 191_1 via the GbE line 32.

In the variation, the LF signal generation unit 165 is a specific example of the "report unit", and it generates an auto negotiation restart signal (a link fault). In the variation, when a fault in a communication performed through the OTN line 31 is detected by the ODU0 alarm processing unit 142, the CSF alarm processing unit 164, and the like, the LF signal generation unit 165 reports an auto negotiation restart signal (a link fault) conforming to IEEE802.3 (or G.709 recommended by ITU-T) to a GbE transmission apparatus 20 which is opposite to this unit 165 via the GbE line 32. Accordingly, it is preferable in the variation that the CSF alarm signal 1641 also be reported to the switch 167. The AN signal detection unit 191_1 also has a function for detecting reception of a configuration ordered-set used for an auto negotiation from a GbE transmission apparatus 20 which is opposite to this unit 191_1 via the GbE line 32.

The timer 192_1 counts the time elapsed since the LF signal generation unit 165 started transmitting an auto negotiation restart signal (a link fault). When the auto negotiation signal detection unit 191_1 does not receive a response within a predetermined time period, the timer 192_1 sends the alternative signal control unit 171 a report such that the switch 172 selects a signal from the OAM frame signal transmission unit 18.

(4-2) Exemplary Operations of Transmission Apparatus in Accordance with Variation Operations of the OTN transmission apparatus 10_1 in accordance with the variation will be described with reference to FIGS. 8 and 9. FIG. 8 is a flowchart showing an operation flow of the variation of the OTN transmission apparatus 10_1. FIG. 9 is a sequence diagram showing the operation flow of the variation of the OTN transmission apparatus 10_1.

Figure 8:
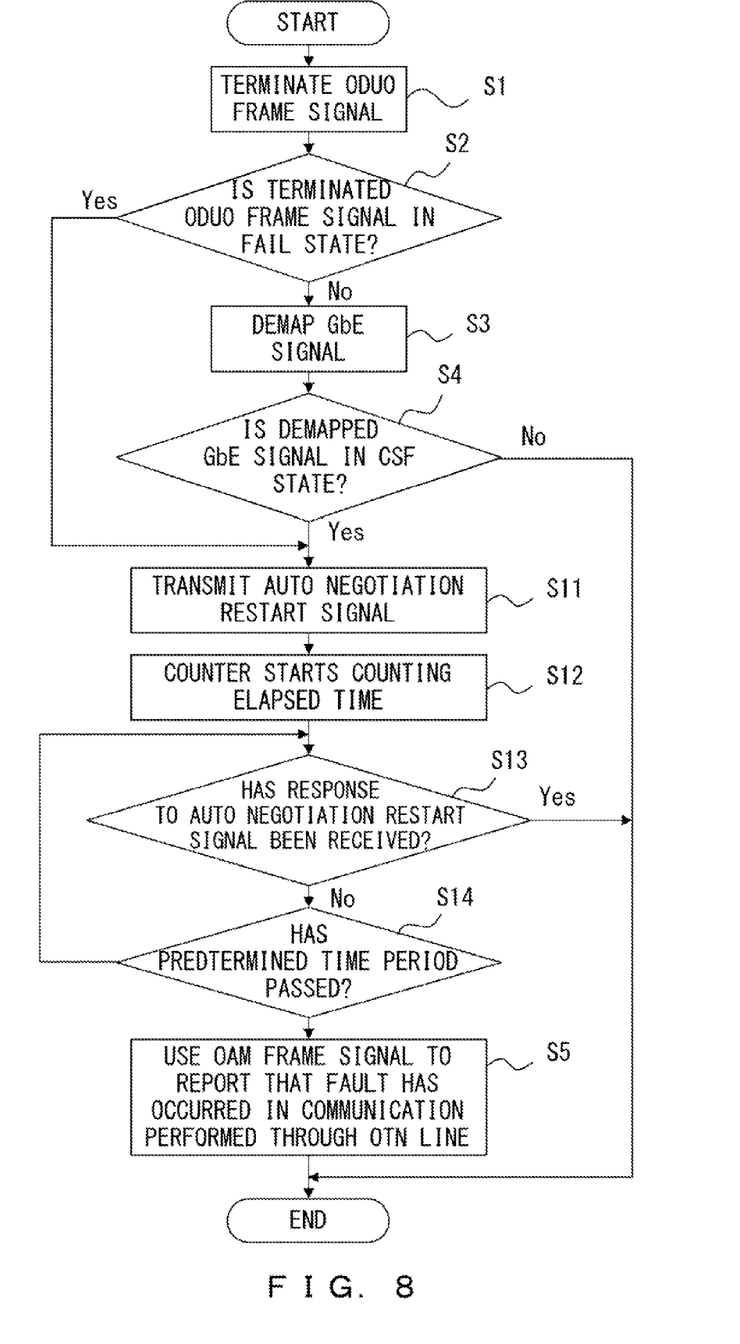
FIG. 8 is a flowchart illustrating an operation flow of the variation of the OTN transmission apparatus.
Figure 9:
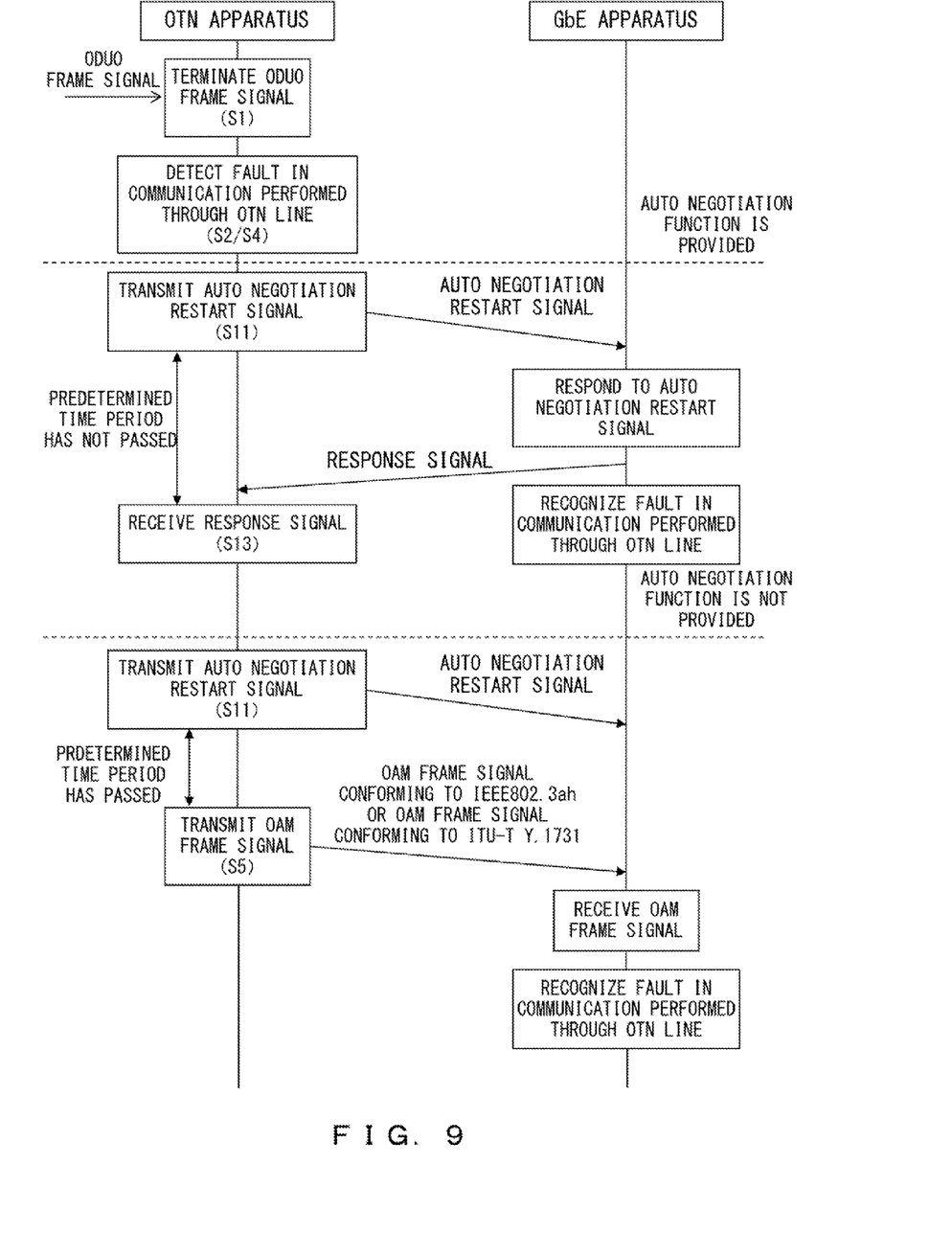
FIG. 9 is a sequence diagram illustrating the operation flow of the variation of the OTN transmission apparatus.

As illustrated in FIGS. 8 and 9, the ODU0P OH termination processing unit 141 terminates an ODU0 frame signal transmitted from another OTN transmission apparatus 10 via the OTN line 31 (step S1), as with the operations of the OTN transmission apparatus 10 described above.

Next, the ODU0 alarm detection unit 142 determines whether the ODU0 frame signal terminated by the ODU0P OH termination processing unit 141 is in a fail state or not (step S2), as with the operations of the OTN transmission apparatus 10 described above.

When it is determined that the ODU0 frame signal is in a fail state as a result of the determination in step S2 (step S2: Yes), it is assumed that a fault has occurred in the OTN line 31. In this case, in accordance with an exemplary operation in the variation, the LF signal generation unit 165 transmits an auto negotiation restart signal (a link fault) to a GbE transmission apparatus 20 which is opposite to this unit 165 via the GbE line 32 (step S11). Simultaneously with the operation of step S11, the timer 192_1 starts to count time elapsed (step S12).

Next, the AN signal detection unit 191_1 determines whether or not a response to an auto negotiation restart signal (a link fault) transmitted in step S11 has been transmitted from a GbE transmission apparatus 20 which is opposite to this unit 191_1 via the GbE line 32 (step S13).

When it is determined as a result of the determination in step S13 that the response to the auto negotiation restart signal (the link fault) has been transmitted (step S13: Yes), it is assumed that the GbE transmission apparatus 20 is provided with an auto negotiation function and that the function is set validly. In this case, upon receipt of the auto negotiation restart signal (the link fault), the GbE transmission apparatus 20 can recognize that a fault has occurred in a communication performed through the OTN line 31. In this case, accordingly, the OAM frame signal transmission unit 18 does not need to use an OAM frame signal to report the occurrence of a fault in a communication performed through the OTN line 31 to the GbE transmission apparatus 20 which is opposite to this unit 18 via the GbE line 32. That is, the alternative signal control unit 171 does not need to control the switch 172 to select an output from the OAM frame signal transmission unit 18 as a signal to be actually output. In other words, the alternative signal control unit 171 may control the switch 172 to select an output from the transparent-demapping processing unit 16 as a signal to be actually output.

In the meantime, when it is determined as a result of the determination in step S13 that a response to the auto negotiation restart signal (the link fault) has not been transmitted (step S13: No), it is then determined whether the elapsed time counted by the timer 192_1 has surpassed a predetermined time period or not (step S14).

When it is determined as a result of the determination in step S14 that the elapsed time counted by the timer 192_1 has not surpassed the predetermined time period (step S14: No), it is continuously determined whether or not a response to the auto negotiation restart signal (the link fault) has been transmitted from the GbE transmission apparatus 20 (step S13).

In the meantime, when it is determined as a result of the determination in step S14 that the elapsed time counted by the timer 192_1 has surpassed the predetermined time period (step S14: Yes), it is assumed that there is no response since the GbE transmission apparatus 20 opposite via the GbE line is not provided with an auto negotiation function. Alternatively, it is assumed that there is no response since the auto negotiation function of the GbE transmission apparatus 20 opposite via the GbE line 32 has been invalidated. In this case, accordingly, the OAM frame signal transmission unit 18 uses an OAM frame signal to report to the GbE transmission apparatus 20 opposite to this unit 18 via the GbE line 32 that a fault has occurred in a communication performed through the OTN line 31 (step S5). That is, the alternative signal control unit 171 controls the switch 172 to select an output from the OAM frame signal transmission unit 18 as a signal to be actually output.

When it is determined after the predetermined time period passes that a response to the auto negotiation restart signal (the link fault) has been transmitted from the GbE transmission apparatus 20, the transmission of the auto negotiation restart signal (the link fault) may be restarted.

Meanwhile, when it is determined as a result of the determination in step S2 that the ODU0 frame signal is not in a fail state (step S2: No), the transparent-demapping processing unit 16 demaps (i.e., trans-decodes) a GbE signal from the ODU0 frame signal (step S3), as with the case of the operations of the OTN transmission apparatus 10 described above.

Next, the CSF alarm processing unit 164 determines whether the GbE signal trans-decoded by the GFP-T trans-decoding processing unit 163 is in a CSF state or not (step S4), as with the case of the operations of the OTN transmission apparatus 10 described above.

When it is determined as a result of the determination in step S4 that the GbE signal is in a CSF state (step S4: Yes), it is assumed that a fault has occurred in a communication performed through the OTN line 31. In this case, accordingly, the operations in step S11 and the steps that follow are performed.

Meanwhile, when it is determined as a result of the determination in step S4 that the GbE signal is not in a CSF state (step S4: No), it is assumed that a fault has not occurred in a communication performed through the OTN line 31. In this case, accordingly, the OAM frame signal transmission unit 18 does not need to transmit the OAM frame signal to the GbE transmission apparatus 20.

As described above, the OTN transmission apparatus 10_1 in accordance with the variation may utilize effects similar to various effects utilized by the OTN transmission apparatus 10 described above.

In addition, by transmitting an auto negotiation restart signal conforming to G.709, the OTN transmission apparatus 10_1 in accordance with the variation may report an occurrence of a fault in a communication performed through the OTN line 31 to the GbE transmission apparatus 20 which is provided with an auto negotiation function and in which the auto negotiation function has been validated. It may also report an occurrence of a fault in a communication performed through the OTN line 31 by selectively transmitting an OAM frame signal to the GbE transmission apparatus 20 which is not provided with an auto negotiation function or the GbE transmission apparatus 20 in which the auto negotiation function has been invalidated. Therefore, irrespective of application or setting of the GbE transmission apparatus 20, it is possible to report that a fault has occurred in a communication performed through the OTN line 31.

It is preferable that the OTN interface 11, the GbE interface 12, the ODU0P termination units 13 and 14, the transparent-mapping processing unit 15, the transparent-demapping processing unit 16, the signal switching unit 17, and the OAM frame signal transmission unit 18 described above each be FPGA, which enables the circuit to be updated, and they may also be composed of ASIC or ASSP.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present invention has (have) been described in detail, it should be understood that the various changes, substitutions, and alterations could be made hereto without departing from the spirit and scope of the invention.

What is claimed is:

1. A transmission apparatus comprising:
a first interface coupled to a first line,
a second interface coupled to a second line, and
a processor coupled to the first interface and the second interface,
the processor that is operative:
to terminate the first line performing a communication using a digital wrapper;
to terminate a signal on the second line performing a communication using Gigabit Ethernet;
to apply a transparent transcoding process to a terminated signal and a signal received from the second line and to output these signals via at least one of the first interface and the second interface; and
wherein when a fault occurs in a communication performed through the first line, an auto negotiation restart signal is reported from the transmission apparatus to an opposite apparatus on the second line, and when there is no response for a predetermined time period from the opposite apparatus, the processor determines that the opposite apparatus is not providing or invalidating an auto negotiation function, and reports information indicating an occurrence of the fault to the opposite apparatus by using a signal of a MAC (Media Access Control) frame format.

2. The transmission apparatus according to claim 1, wherein
the first line is an OTN (Optical Transparent Network) line.

3. The transmission apparatus according to claim 1 or 2, wherein
the signal of a MAC frame format is an OAM signal conforming to IEEE802.3ah or an OAM signal conforming to Y.1731 recommended by ITU-T.

4. The transmission apparatus according to claim 1, wherein
when there is a response from the opposite apparatus to the auto negotiation restart signal within the predetermined time period, the processor is operative not to report the occurrence of the fault by using an OAM signal.

5. The transmission apparatus according to claim 1, wherein
the auto negotiation restart signal is an auto negotiation restart signal conforming to IEEE802.3.

6. The transmission apparatus according to claim 1, wherein
when a fault does not occur in a communication performed through the first line, the transmission apparatus performs a transparent transmission which does not refer to a MAC frame, such that (i) a signal transmitted via the terminated first line is transmitted to the terminated second line or (ii) a signal transmitted via the second line, which is terminated, is transmitted to the first line.

7. The transmission apparatus according to claim 6, wherein
the transparent transmission conforms to Chapter 17.7.1.1 of G.709 recommended by ITU-T.

8. A fault reporting method for reporting a fault in a transmission apparatus which terminates a first line by which a communication is performed using a digital wrapper and a second line by which a communication is performed using Gigabit Ethernet, the method comprising:
transparently terminating a signal on the second line;
determining whether or not a fault has occurred in a communication performed through the first line;
when it is determined that a fault has occurred in the communication performed through the first line, an auto negotiation restart signal is reported to an opposite apparatus on the second line, and when there is no response for a predetermined time period from the opposite apparatus, determining that the opposite apparatus is not providing or invalidating an auto negotiation function, and reporting information indicating an occurrence of the fault to the opposite apparatus on the second line by using a signal of a MAC (Media Access Control) frame format.

* * * * *